Nov. 19, 1968     T. S. DURAND     3,411,777

TOY FOR TESTING BALANCING SKILL

Filed Oct. 11, 1965     2 Sheets-Sheet 1

*INVENTOR.*
TULVIO S. DURAND

BY

ATTORNEY

Nov. 19, 1968   T. S. DURAND   3,411,777
TOY FOR TESTING BALANCING SKILL
Filed Oct. 11, 1965   2 Sheets-Sheet 2

INVENTOR.
TULVIO S. DURAND
BY
ATTORNEY

United States Patent Office 3,411,777
Patented Nov. 19, 1968

3,411,777
TOY FOR TESTING BALANCING SKILL
Tulvio S. Durand, Inglewood, Calif., assignor to
Systems Technology, Inc.
Filed Oct. 11, 1965, Ser. No. 494,418
3 Claims. (Cl. 273—1)

ABSTRACT OF THE DISCLOSURE

A device for testing balancing skill. An outer lightweight tube has a viscous damping fluid filling its interior. Suspended and movable within the damping fluid is a dense bobweight element configured to fit the interior of the tube. The bobweight has an orifice along its periphery to allow for passage of the viscous fluid as the bobweight drops from the top of the tube to the bottom as the bottom end of the tube is balanced by a user. Both ends of the tube are sealed.

---

It has been observed that a long slender rigid rod of about four or five feet length, such as a broomstick, may be balanced or maintained in a substantially vertical position on one's fingertip with little effort. However, as a progressively shorter rod is employed, the balancing thereof is progressively more difficult. In fact, a short slender rod such as an ordinary lead pencil of six inches length cannot be easily balanced in a vertical position by the ordinary person. The actual effective length sought to be so balanced is the dimension from the tip or end of the rod (about which the rod is sought to be balanced) to the center of gravity (C.G.) of the rod. Hence, the effective length of an actual rod may be determined or altered by the addition or cooperation of a bobweight element therewith.

The precise minimum effective length which may be so balanced or maintained in a substantially vertical position by means of one's fingertip has been discovered to be indicative of the dynamic response or speed of response of such person. Therefore, it is a concept of the subject invention to provide a balancing task of progressively increasing difficulty whereby the response limits of a person may be measured and indicated.

The application of a vertical balancing task as a means of indicating a person's dynamic response characteristics has been described in a report, "The Human Operator in a Closed Loop System," by John M. Moten, published by the Department of Aircraft Electrical Engineering, of the College of Aeronautics, Cranfield, England in June 1959. The described experiment, however, employs apparatus for balancing a rod in a single vertical plane, in which the rod rests upon a trolley mounted upon a set of tracks. The task is limited to a single plane by mounting the end of the rod for rotation about a horizontal axis fixed relative to the trolley and perpendicular to the tracks, whereby the rod-to-be-balanced is free to rotate in a plane parallel to the tracks on which the trolley is mounted. Balancing of the rod is attempted by translational motion of the trolly back and forth along the tracks, so as to "track" or follow the angular motion of the upper or distal end of the rod. Provisions are made for fixing a bobweight at one of discrete points along the length of Moten's rod during each test, successive tests employing a lower bobweight position. In other words, the device of Moten provides a limited task employing a selectively fixed bobweight length and requiring only uniplanar motion, and does not provide a complete balancing task of progressively increasing difficulty.

In a preferred embodiment of the subject invention, there is provided a rigid pendulum to be balanced in an inverted vertical position and having an adjustable period of at least .63 second, the effective length of such pendulum, when inverted, progressively decreasing, representing a corresponding decrease in the time constant of the divergent root of the characteristic equation of such inverted pendulum. There is further provided means for limiting the rate of variation of the effective length of such inverted pendulum to an amount corresponding to a rate of variation of such divergent root not exceeding 0.5 radian per second per second.

In normal operation of the above described arrangement, the center-of-gravity position or effective length of the inverted pendulum slowly slides down such inverted pendulum during one's attempt to balance the inverted pendulum in an upright position upon one's open hand or fingertip. As the effective point of the center-of-gravity slides down the pendulum, the shortening distance of the effective length from the balance point (or lower end of the rod) to the descending center of gravity provides a balancing task of progressively increasing difficulty, the task not being confined to motion in a single vertical plane. Further, because the task is one of progressively increasing difficulty, and not a static task of fixed difficulty, the human operator cannot readily "learn" the task, and hence the limit of the operator's performance can be more objectively indicated. Therefore, although the device is useful for amusement, it may also serve as a clinical device for the measurement of a limit of human operator performance.

Accordingly, it is an object of the invention to provide a device for testing the response of a human operator.

It is another object of the invention to provide a device presenting a balancing task of progressively increasing difficulty for testing the response of a human operator.

It is yet another object of the invention to provide means indicative of the reaction response time of a human operator in a tracking situation.

It is a further object to provide a balancing task type toy for entertainment purposes.

These and other objects of the invention will become apparent from the following description, taken together with the accompanying drawings in which.

In the figures, like characters refer to like parts.

Figure 1:
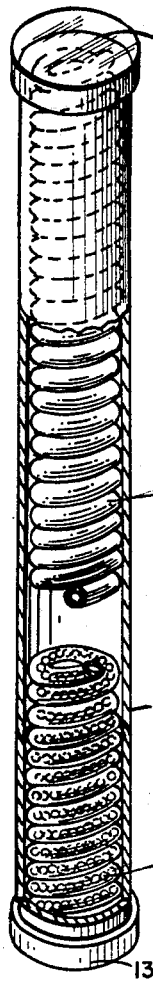
FIG. 1 is an exemplary embodiment of the inventive concept.

Referring now to FIG. 1 there is illustrated an exemplary embodiment of the invention. There is provided a lightweight, rigid, slender rod 10, such as a hollow plastic tube the extremities of which are sealed. Extending axially of, fixed adjacent to, and internally concentric with, hollow tube 10 is a helical track or helically-wound tube 11. Sealed tube 10 also contains a bobweight 12 having a density substantially greater than that of rigid member 10 and helical member 11 combined, and slidably mounted thereon for translational movement axially of rigid member 10 (when vertically positioned) under the influence of gravity. Such bobweight 12 comprises a plurality of pieces of lead pellets. Helix 11 may be flanged or otherwise shaped so as to provide a track or conduit for providing a controlled path for the pellets whereby they roll or slide as an aggregate mass around the helix as the bobweight mass 12 progresses axially down the axial extent of the vertical tube under the influence of gravity. Where helix 11 is formed of a helically wound tube, then rigid rod 10 may be comprised of such helical member, itself. The prolonged path provided by the helix, relative to the axial length thereof, together with the friction of the mass of the pellets in cooperation therewith, serve to limit the axial rate at which the bobweight of FIG. 1 descends under the influence of gravity. In this way, the effective length of the center-of-gravity of the rod to be balanced measured from the balance point 13, is progressively shortened during the performance of the balancing task, thereby progressively increasing the difficulty of the balancing task.

Where it is desired to further impede or slow the rate of descent of the bobweight, a low-density damping fluid having a selected viscosity, greater than that of air, may be employed in tube 10.

The arrangement of FIG. 1, if rotatably suspended at one end with the center of gravity located below the point of suspension, behaves as a pendulum, the well known characteristic equation of the undamped oscillatory motion of which, in Laplace notation, is:

$$S^2 + \omega_n^2 = 0 \qquad (1)$$

where:

$$\omega_n = 2\pi f = \frac{2\pi}{P} = \frac{2\pi}{2\pi}\sqrt{g/L} = \sqrt{g/L}$$

$L$=effective length to the pendulum center of gravity from the point of suspension.
$g$=gravitational constant.
$\omega_n$=undamped natural frequency in radians per second.

As is well understood in the art, such an arrangement is neutrally stable (ignoring friction); and, in response to an angular perturbation, oscillates at an amplitude equal to the magnitude of the perturbation, and with a period P which decreases with a decrease in the dimension L.

Where the pendulum of Equation 1 is sought to be inverted and balanced, in the manner described for the inverted pendulum of FIG. 1, the characteristic equation may be written as:

$$(S^2 - \omega_n^2)\left(S + \frac{1}{T_1}\right)\left(S - \frac{1}{T_1}\right) = 0 \qquad (2)$$

where:

$$\frac{1}{T_1} = \omega_n = \frac{2\pi}{P}$$

In other words, the poles or roots of the characteristic equation of Equation 2 are a respective minimum and non-minimum phase root, rather than the complex conjugate pair of roots represented by Equation 1. The magnitude of the roots of Equation 2 are determined from the same geometrical considerations as that of Equation 1. As is well understood in the controls art, the response of a controlled element having a single non-minimum phase or divergent term, when perturbed, is a nonoscillatory divergent response to such perturbation. Such divergent response in the case of an inverted pendulum, such as a vertically balanced broom handle, is demonstrated by the angular motion of the same, falling away from the vertical position at an ever increasing rate in response to such perturbation. In other words, when the inverted pendulum is disturbed from the neutrally stable condition of being vertically balanced, it falls down.

A human operator's efforts to balance the inverted pendulum may be likened to a closed loop tracking task involving an unstable element-to-be-controlled having a pure divergent term, the nonminimum phase term $(s - \omega_n)$, corresponding to such pure divergent term. A description of such tracking task is provided in copending U.S. patent application Ser. No. 432,702, filed Feb. 15, 1965, by Ashkenas et al., assignors to Systems Technology, Inc., assignee of the subject invention. In such application it is explained that the maximum value for such divergent root condition under which the human operator can effectively exert a closed loop control function is limited by, and is therefore indicative of, the particular minimum response time of a selected human operator, being on the order of about 1/10 second.

It has been experimentally determined that the ordinary person cannot balance an inverted pendulum which, when rotatably suspended as a conventional pendulum, demonstrates a period P of oscillation of less than approximately .63 second. Such minimal period is equivalent to a minimal time constant of one-tenth of a second and corresponds to a simple inverted pendulum of no less than about four inches in length (or a compound pendulum comprising a homogeneous rod of about eight inches length), representing the shortest length pendulum that the ordinary person is able to balance in an inverted position:

$$P = 2\pi\sqrt{\frac{L}{g}} \qquad (3)$$

$$L_{min.} = \frac{P^2_{min.} g}{4\pi^2} = \frac{(.63)^2 32}{4\pi^2} = 0.32 \text{ feet or } 3.84 \text{ inches} \qquad (4)$$

Accordingly, the effective axial length of the device of FIG. 1 should be at least four inches long, an impossible balancing task; and should preferably be several times that length (say, 20 to 24 inches), in order to allow the performance of a plausible task of increasing difficulty. With the bobweight of the inverted pendulum of FIG. 1 initially in the uppermost position, and subsequently slowly descending under the influence of gravity, the descent distance at which the human operator loses control of, or cannot continue to balance, the inverted pendulum is an indication or measure of his skill or response limits. For this reason, easily viewed vertical graduations or a scale may be scribed or marked on the tube of FIG. 1, to assist in quantitatively or comparatively indicating such skill or response limit.

Also, the length of time that the operator performs the balancing task, commencing with a selected initial position of the slowly-descending bobweight, is indicative of the final position of the bobweight at the termination of the task performance. Therefore, the operator's skill or response limit may be indicated, alternatively, by the duration of his performance interval.

The rate of descent of the bobweight under the influence of gravity should be slow enough to provide an adequate opportunity for the human operator to adapt to the changing control task, a limiting velocity not exceeding one inch per second appearing to be adequate for such purposes; although the total period of bobweight gravitation or descent should not occupy so long an interval as to fatigue the human operator. In a preferred embodiment, the device of FIG. 1 may demonstrate an oscillatory period of 1.57 seconds, corresponding to a pendulum length of about 24 inches; and provide a descent interval of about 60 seconds, which interval corresponds to a rate of variation of the divergent root of Equation 2 not in excess of 0.5 radian per second per second.

Figure 2:
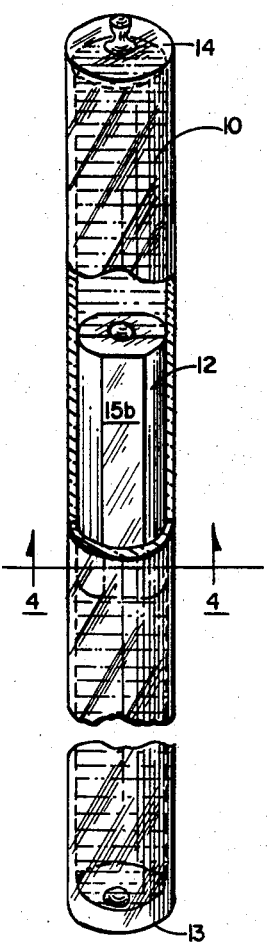
FIGS. 2 and 3 are illustrations of alternate embodiments of the inventive concept.
Figure 3:
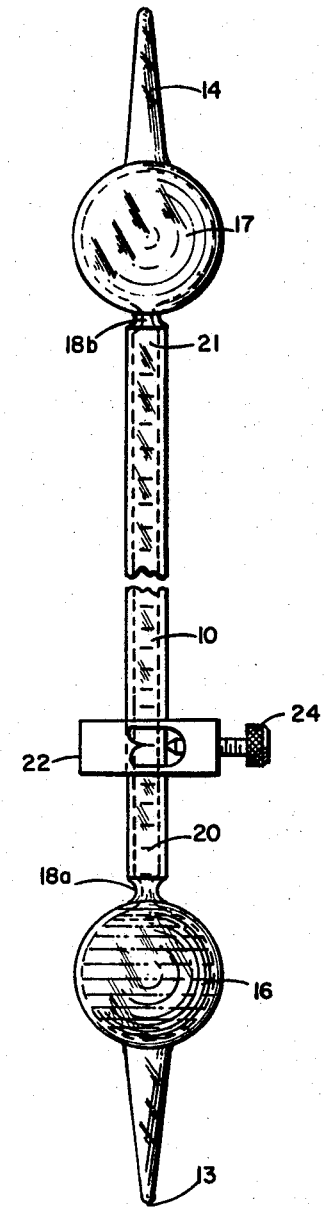

Two alternate embodiments to that of FIG. 1 are shown in FIGS. 2 and 3.

Referring to FIG. 2, there is illustrated a simpler embodiment than that of FIG. 1, comprising a rigid lightweight hollow tubular segment 10 of substantially uniform cross section, both axial extremities 13 and 14 of which are sealed, the segment 10 being of similar axial dimension as that of FIG. 1. A bobweight element 12, such as a high density slug, is contained within tube 10 and adapted for sliding motion axially of tube 10 in the manner of a piston slidably mounted in a cylinder. Hence, bobweight 12 will slide down tube 10 under the influence of gravity when tube 10 is a vertical position. The remainder of the enclosed volume within tube 10 is substantially filled with a low density damping fluid. Bobweight 12 may have orifice means extending longitudinally through bobweight 12 and substantially parallel to the direction of the axial motion thereof.

Figure 4:
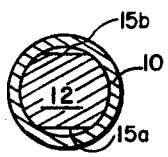
FIG. 4 represents a cross section of the device of FIG. 2.

The cooperation of the damping fluid with the orifices, during the above described axial motion of bobweight 12 when tube 10 is vertically oriented, limits the rate of such axial motion as is well understood in the art. Such limit is selcted to not exceed one inch per second, being preferably on the order of about one-quarter of an inch per second for a device having an overall length of about two feet. Such orifice means may comprise one or more holes drilled through and parallel to the longitudinal axis or axis of revolution of slug 13. However, it is more convenient to alternatively provide selected shaping of the cross section of slug 12 by filing or otherwise shaping a substantially longitudinal flat face 15a and 15b along one or more sides of slug 12, shown more clearly as a recessed edge in a cross section view of FIG. 2, as illustrated in FIG. 4.

To the extent that the rods 10 of FIGS. 1 and 2 are each symmetrical, and that the associated bobweights 12 thereof arranged for reciprocal, velocity-limited motion longitudinally thereof, it is clear that the bobweight can be made to fall from that end of rod 10 upon which it is resting, merely by quickly inverting rod 10. Hence, the velocity-limited properties of the variable falling bobweight 10 for the device of FIG. 2, for example, may be observed to be the same whether the device, immediately upon being inverted, is either suspended as a conventional pendulum or sought to be supported or balanced as an inverted pendulum. Also, the magnitudes of the roots of the characteristic equation for the inverted pendulum are the same as those for the conventionally suspended pendulum, the latter being related to the undamped period of the pendulum, as indicated by Equations 1 and 2. Hence, the maximum period $P_1$ obtainable with the conventionally suspended compound pendulum of FIG. 2, for example, by means of the extreme (at rest or downward) position of bobweight 12 corresponds to the maximum time constant $T_1$ obtainable for the device as an inverted pendulum:

$$T_1 = P_1/2\pi \qquad (5)$$

Although the embodiment of FIG. 2 (and to some extent the device of FIG. 1) illustrates a pendulum of progressively increasing period employing a single discrete bobweight element, whose center of gravity progressively moves, the concept of the invention is not so limited. Instead of a discrete mass, a particulate (or granular) mass or a liquid mass may be employed, as shown in FIG. 3.

Referring to FIG. 3, there is illustrated an alternate embodiment of the variable-period rigid pendulum of the invention. There is provided a rigid lightweight hollow tubular segment 10 at least six inches in length; and a first and second lightweight reservoir 16 and 17, each rigidly connected to a mutually exclusive end 20 and 21 of segment 10 as to be in fluid communication therewith, the reservoirs 16 and 17 and segment 10 defining a sealed chamber. There is also provided means 18a and 18b for restricting the fluid communication between tubular segment 10 and each of reservoirs 16 and 17.

A compound bobweight may be provided by a quantity of either a particulate (or granulated) dense material or a dense liquid. In the use of the arrangement of FIG. 3, the bobweight material, flowing under the influence of gravity, is distributed substantially at the two reservoirs, the nature of the distribution between the two reservoirs determining the location of the progressively-moving center-of-gravity of the compound pendulum.

As shown in the arrangement of FIG. 3, the points of support or suspension 13 and 14 are not located at the reservoirs, but are located axially therefrom so as to increase the overall axial length of the device. In this way, the visual attention of the operator tends to be directed away from the tip of the inverted pendulum to be balanced, and upon the reservoir, as a "point-of-regard." The effect of so changing the point-of-regard is to tend to change the nature of the balancing task presented to the human operator, the task becoming easier to perform as the point-of-regard is made to approach the instantaneous center-of-percussion.

Although the length of time the operator is able to perform the balancing task (upon inverting a full reservoir to the upper position) is indicative of his skill, as previously described, graduation marks may be marked on transparent reservoirs whereby such skill may be alternatively indicated by the amount of the bobweight material observed in a reservoir at the point at which the human operator loses control of the balancing task.

Alternatively, graduation marks may be scribed along the length of rod 10 and a discrete weight 22, slidably mounted upon and externally concentric of rod 10, secured at a selected one of a plurality of locations along the length of rod 10, by means of a thumbscrew 24 or the like, as illustrated in FIG. 3. In this way, the flowing mass from upper reservoir 17 to lower reservoir 18 serves as a vernier adjustment to progressively vary the pendulum geometry about the gross adjustment, such gross adjustment or discrete weight position serving as a scoring indicator. In the balancing of such arrangement, the lower the position of the discrete weight and the longer the performance of the balance task, the higher the associated score or indication of skill.

Because of the significance of the variable geometry employed in practicing the concept of the invention, an embodiment is to be preferred which easily lends itself to providing a wide range of geometrical variations. Such a preferred embodiment is one employing a telescoping rigid member, as shown more particularly in FIG. 5.

Figure 5:
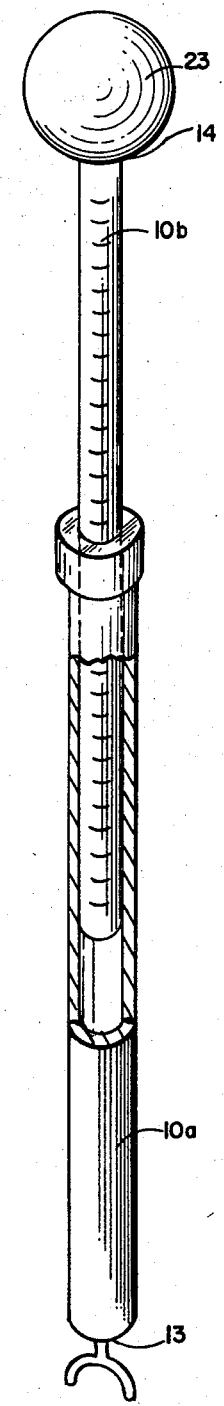
FIG. 5 is an illustration of a preferred embodiment of the invention.

Referring to FIG. 5, there is illustrated a preferred embodiment of the invention in which rigid member 10 is comprised of a rigid tubular base number 10a having an enclosed end 13 and into which base member a rigid member 10b is slidably mounted for cooperation therewith as a telescoping member. A bobweight element 23 is mounted at the outer or exposed axial extremity 14 of telescoping element 10b. It is to be appreciated that, in the extended position shown in FIG. 5, bobweight 23 and element 10b move down together under the influence of gravity, element 10b telescoping into element 10a. Because the combined mass of both element 10b and bobweight 23 so move, a greater mass transfer may be effected, than by a slidably mounted bobweight sliding down a rigid member of fixed length (e.g., fixed mass distribution).

Velocity-limiting in the arrangement of FIG. 5 tends to be achieved by means of (1) the sliding friction of the telescoping action and (2) the fluid damping provided by the cooperation of entrapped air with the annular orifice or restricted cross sectional area between telescoping members 10a and 10b through which the air escapes. It is understood, for example, that as member 10b further telescopes into member 10a, the increased surface contact increases the sliding friction, while the increased axial length of the annular orifice presented by the telescoping surfaces tends to increase the fluid damping. If desired, an adjustable orifice may be employed, at the base 13 of member 10a alternatively or in addition to the velocity-limiting means described.

Although the device of the invention has been described as a rigid compound pendulum the period of which progressively varies under the influence of gravity, the concept of the invention is not so limited, self-contained clock work means being equally adaptable to altering the geometry (e.g., telescoping devices) so as to progressively vary the period of such pendulum at one of the above noted preselected rates between the above noted preseletced limits. Further, although the device of the invention has been described as a compound pendulum of fixed mass, or overall weight, having a variable geometry, the concept may also be adapted to employ a progressively reducing bobweight mass, such as a bobweight material subject to sublimation whereby the reduction in mass is accompanied by a variation in the distribution of mass, as to vary the period of the pendulum.

Moreover, although the concept of the invention has been described as a balancing skill device comprising an inverted pendulum of progressively decreasing effective length in an unchanging gravitational field, the concept is not so limited. It is clear, for example, that the balancing skills of astronauts and other human operators may be tested in an artificial gravitational environment by using a pendulum of fixed geometry and fixed mass distribution and progressively increasing the gravitational field to which such operator is subjected, to vary the effective pendulum period between the preselected limits at the preselected rate.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A balancing-skill device requiring a progressively increasing amount of skill, comprising in combination:
   a rigid lightweight hollow tubular segment of substantially uniform cross-section both axial extremity of said segment being sealed, said segment being at least six inches in length;
   a high density bobweight element enclosed within said segment and adapted for sliding motion axially thereof; and
   a low-density damping fluid substantially filling the remainder of the volume enclosed within the tubular segment, said bobweight having a longitudinally extending recessed face as orifice means substantially parallel to the direction of said axial motion, the cooperation of said bobweight and said damping fluid under the influence of gravity, when said segment is oriented in a substantially vertical position, limiting the said axial motion of said bobweight relative to said tubular segment to not in excess of one inch per second.

2. A balancing-skill device requiring a progressively increasing amount of skill, comprising, in combination:
   a rigid longitudinal lightweight member which, when rotatably mounted at and suspended from one end, acts as a pendulum having a natural period of at least 0.63 second;
   a high density bobweight mounted relative to said rigid member for translational movement axially of said rigid member for substantially modifying the center of gravity of said pendulum; and means for limiting the vertical velocity at which said bobweight slides down said rigid member under the influence of gravity to no more than one inch per second.

3. A balancing skill device comprising in combination:
   an invertible rigid pendulum having a period which progressively increases under the influence of gravity to a maximum period not less than 0.63 second, said pendulum comprising a lightweight symmetrical hollow tubular segment of substantially uniform inside cross section and at least six inches in length, both axial extremities of said segment being sealed, said sealed segment containing a symmetrical high-density bobweight adapted for sliding motion axially of said segment; and
   means for limiting the rate of variation of the roots of the characteristic equation of said pendulum to no more than 0.5 radian per second per second, and comprising a low density damping fluid and a recessed edge form in the uniform cross section of said bobweight, said recessed edge cooperating with said internal cross section of said segment to provide longitudinal damping orifice means.

References Cited

UNITED STATES PATENTS

| | | | |
|---|---|---|---|
| 2,644,890 | 7/1953 | Hollihan | 58—144 |
| 3,171,245 | 3/1965 | Breed | 58—144 |
| 3,211,457 | 10/1965 | Dreyer | 273—115 |

RICHARD C. PINKHAM, *Primary Examiner.*

P. E. SHAPIRO, *Assistant Examiner.*